United States Patent [19]

Jarnagin

[11] 4,189,346

[45] Feb. 19, 1980

[54] OPERATIONALLY CONFINED NUCLEAR FUSION SYSTEM

[76] Inventor: William S. Jarnagin, P.O. Box 127, Concord, Mass. 01742

[21] Appl. No.: 887,442

[22] Filed: Mar. 16, 1978

[51] Int. Cl.² .................................................. G21B 1/00
[52] U.S. Cl. ........................................................ 176/5
[58] Field of Search .......................... 328/234; 313/62; 315/111.4, 111.7; 176/1, 2, 3, 5

[56] References Cited

U.S. PATENT DOCUMENTS

| | | | |
|---|---|---|---|
| 2,953,718 | 9/1960 | Ducati | 176/1 |
| 3,155,592 | 11/1964 | Hansen | 176/1 |
| 3,258,402 | 6/1966 | Farnsworth | 176/1 |
| 3,533,910 | 10/1970 | Hirsch | 176/1 |
| 3,664,920 | 5/1972 | Hirsch | 176/1 |
| 3,935,503 | 1/1976 | Ress | 176/2 |

FOREIGN PATENT DOCUMENTS

884705 12/1961 United Kingdom .................... 176/3

*Primary Examiner*—Samuel W. Engle
*Assistant Examiner*—S. A. Cangialosi

[57] ABSTRACT

This invention consists of a system for generating clean controllable inexpensive electrical power by nuclear fusion (not fission) of light weight atoms and/or isotopes of hydrogen such as deuterium. Fusionable ions are accelerated head-on from many directions through the middle of a reaction chamber. Such ions are produced by especially designed cyclotrons aimed at one another. Since the orbital motion and escape velocity of an ion is controlled by the magnetic field of its originating cyclotron, said ion cannot hit the outer wall of the opposite magnet (which is of equal strength). Hence the system's plasma is operationally contained. The system can produce plasmas of practically any desired average velocity hence temperature; and in densities approaching $10^{20}$'s per cc at the center of the reaction chamber. These conditions are abundantly ample for practical production of fusion.

1 Claim, 4 Drawing Figures

OPERATIONALLY CONFINED NUCLEAR FUSION SYSTEM

The goal of this invention is to produce electrical power by clean, controllable, economical nuclear fusion (not fission) of certain isotopes of hydrogen and other leightweight atoms. Fusion has long been an interest of mine, beginning seriously about 1958 when studying nuclear physics. This is one of several inventions I have made in nuclear fusion and my third formal application for letters patent in this classification. A brief background leading to this invention is given:

BACKGROUND

While this invention does not necessarily involve lasers (although they could be optionally superposed onto my system) I immediately wondered in the early 1960's when lasers first appeared whether or not they could be used to heat fusionable materials to reaction temperatures. But it was not until early 1964 that I got a chance to construct a helium-neon laser with my own hands and to experiment with ruby lasers. Some of my associates at the former Maser Optics Co. Inc. of Boston were using ruby lasers to punch through refractory and very hard materials. It took them many shots and much repumping time between shots to get through even thin sheets of certain alloys with the early mw ruby lasers.

Already with a view toward laser implosion of fusionable material, I suggested to my associates that it might be quicker to split the beam and direct same from opposite sides of a sheet. My reasoning was that the momentum of material from one side would reinforce the ablation of the other. So for dual reasons I set up in one of the work rooms what I believe to be the world's first experiment to deliberately converge laser beams head-on with a view toward eventual laser implosion of fusionable pellets. With a (weak) 1 mw ruby laser I punched through uniform thicknesses of certain alloys including nichrome —with and without splitting the beam. When hitting the sheets from one side I made the beam take a pathway equal in optical thickness to that from both sides. I tried to equalize the ambient temperature for each approach. Indeed fewer shots were required when attacking the sheets from both sides simultaneously. Then I spent a few weeks informally sketching various spherical laser implosion systems including one combination laser-fusion system sharing the same (deuterium) gas.

In April, 1964, I telephoned the former Atomic Energy Commission and eventually proposed to Dr. Arthur Ruark, Head of the Thermonuclear Division, that lasers be used to spherically implode fusionable material. At that time fusion was still partly classified as secret by the U.S. Government, so Dr. Ruark could not discuss specific temperatures; but he did say that he seriously doubted that lasers (of that time or the immediate future) could produce the temperatures requisite for fusion. I argued that lasers are parallel, not point, sources of light, hence can be made as intense as one desires by merely making the amplifiers larger—all without violating any laws of thermodynamics. Dr. Ruark said that even so their efficiencies were too low to result in a net energy yield from fusion. That point I could not argue with, except to say that perhaps lasers could be used only to start nuclear reactions and the reactant products could complete same. Dr. Ruark remained highly doubtful about the "pumping ratio" of lasers and concluded "write up your experiment, send it in and maybe we'll look at it again someday if lasers improve." Well, I wrote it up, got it witnessed by some of my associates, and still have the original for I did not send it to the AEC in view of the skepticism of the man who would pass judgment on its potential.

Three years later, in 1967, The AEC nonetheless funded a program at the Lawrence Laboratory at Livermore, Ca. to do precisely what I had suggested to Dr Ruark. No word was transmitted to me about the project. It was several years later that I read about the program—after fusion was entirely declassfied.

Meanwhile work in that program indicated that it was not the incident photons per se that moved the fusionable atoms inward, but rather it was the electrons knocked loose by the photons that imploded and caused the reactions. Consequently, I reasonsed that maybe electrons themselves could be accelerated directly into the pellets. After all electrons have more mass and momentum by far than photons and despite electrons' electrostatic repulsion for one another they can be focussed sharply onto a pellet 1 mm in diameter. However, on further analysis another approach looked even more promising.

COMPARISON OF INVENTIONS

An inescapable reason why all pellet fusion systems are doomed to at least 50 percent energy input loss is that the center-of-mass of the pellet must be shifted when bombarded by anything—photons, electrons, ions, neutrons, or micro-micro pellets. Whereas all the kinetic energy of ions colliding head-on can go into reactions because the C. M. of the system neen not be shifted. Furthermore, the effect is non-linear and increases spectacularly at relativistic ion energies. Consequently, I began to look seriously again at various colliding beam and head-on plasma possibilities (using starter pellets if necessary). Early attempts by others at colliding beams had gone nowhere because of lack of beam densities. The density of solid material such as pellets of frozen D, T, is millions of times greater than that of ion beams ($10^{19-20}$ vs $10^{13}$). However, I thought I could achieve the same effective density of pellets If I could feed back or recycle uncollided ions head-on tens of millions of times per second. Also hard focussing could help, plus large numbers of focussed beams.

Accordingly, I have since invented several head-on fusionable ion systems, some more promising than others. Of these I have now filed for letters patent on three. The first (Ser. No. 788,017, series 1970) consists of a spherical arrangement of figure-eight tandem accelerators with their common intersection enlarged into a reaction chamber. Actually, this system is largely geared toward super heavy particle research and probably is not adequately efficient for practical production of electrical energy.

My next application for letters patent on one of my invented fusion systems was for a spherical combination of c-magnets and magnetic mirrors. Ions are accelerated across gaps in a pair of perforated "bowl" electrodes located at the center of the system. Accelerated ions are discharged into the surrounding magnets, thence turned back along helical pathways with little or no energy loss. (Ions only change vectorial velocity, that is direction, but not speed or energy in a deflecting magnetic field, but they can change both speed and energy as well as direction in an electric field.) Thus as ions gain energy from the KVHF across the bowl halves, they sweep out greater helical pathways, the envelopes of which are progressively larger dumbbells. With some 30 magnet pairs and as many dumbbell plasmas crossing the center of the system, ion densities and average velocities should be adequate for practical rates of fusion. However, this system lacks true symmetry. The bowl halves tend to accelerate ions along an axis threading the aperatured bottoms of the bowls, not perpendicular to same. Whereas a high degree of ion velocity symmetry is needed to help contain the plasma operationally. Also at some point the ions could gain too much energy for the magnets to deflect back to the reaction region; hence they could strike the walls of the container, and lose the energy invested in them. For these reasons I worked out the invention which is next discussed, the one at hand.

DISCUSSION OF THE INVENTION

This invention, an OPERATIONALLY CONFINED NUCLEAR FUSION SYSTEM, consists primarily of what I have named Ring Cyclotrons arranged in cylindrical or preferably spherical overall form. (I feel that I have extended cyclotrons well beyond the state of the art of their typical usage (target bombardment) in inventing this nuclear fusion system.) A cross section through a ring cyclotron of my invention appears like two C-magnets "looking at one another;" that is, a C-magnet is swept about in a ring or circle, then tilted and packed into overall spherical form.

Lining each ring like gap in the magnets are flat ring electrodes across which are connected a kilovolt megahertz oscillator. Ions are injected all along (around) the electrode gaps to provide a copious supply of fusionable ions. The ions are accelerated each time they cross the electrode gaps. Also the ions are deflected by the magnetic field, resulting in cyclotron spiral pathways around each injection port. Thus the ions travel initially in small spirals within the larger band-like circle of each ring cyclotron.

After gaining sufficient orbital velocity the ions are discharged into the inner spherical region of the system, or Reaction Chamber. The ions are partly focussed toward the center of the reaction chamber by the curvilinear geometry of the system and partly by Focus Rings (see drawings). Optionally, ions can periodically be deflected out of orbit toward the reaction chamber by high voltage applied to the outer rim of each ring cyclotron.

In brief, a spherical arrangement of the ring cyclotrons of this invention provides a centrally directed plasma of practically any desired density and temperature at the center of the system. This invention provides a plasma which is operationally contained by the magnets and deflection voltages which cause the centrally directed motion of the ions in the first place. Scattered ions or ions arriving at the opposite cyclotron out of phase merely drop back a bit in orbit and are quickly reaccelerated to fusion velocity. Bremstrahlung and synchrotron radiation is/are partly reflected back toward the center of the system by means of the spherically curved inner surfaces of the components of the system plus the silvery property of the lithium or other coating over same.

Energy is taken off in the usual manners, namely by heat absorbers and charged coils. The heat absorber for D, T reactions is lithium which absorbs reactant neutrons and breeds tritium, that is, more fusionable fuel. Other uncharged reactant products such as alphas and x-rays are also absorbed. Heat from the absorbed reactants is converted to electricity by customary steam turbine techniques. Kinetic energy from reactant charge products such as electrons and protons is taken up directly by charged coils and an EMF is impressed directly on a load line, part of which is fed back to energize the magnets, focus rings, deflection rims, accelerating electrodes and vacuum pumps of the system. Supercooling gas liquification pumps can be built directly in the system.

The ring cyclotrons of this invention serve several unique and important functions:

1. Low-energy ions, without sufficient kinetic energy to fuse, are generally kept out of the way of those which have reached fusionable energies. The low k.e. ions are confined to spiraling locally around injection ports in the large flat rings well away from the center of the reaction chamber. This is important because otherwise the slow ions cool the plasma at the center of the reaction chamber.

2. The magnets, not the electrodes, control the orbital motion of the ions. This is important because it means the ions can in principle be kept from striking the container walls. Even energetic ions discharged through the reaction chamber are kept from hitting the opposite wall because they are caught up in a magnetic field which has the same strength as that from which they left. In effect the ions go from the gap of one C-magnet into that of another of equal strength.

3. The ring cyclotrons can generate and discharge into the reaction chamber literally thousands to millions of jets of ions at densities on the order of $10^{13}$ ions per cc per jet. Focussed ion density at the center of the system can thus approach $10^{20}$'s per cc.

4. Ions of any desired (designed) velocity can be delivered to the center of the reaction chamber by the ring cyclotrons. This is highly important because it means a plasma can be created at the center of the chamber with any desired average velocity. Since the slow ions are kept out of the way—back in the magnets—the center of the plasma can consist almost entirely of high velocity ions. An average ion energy at the center of the chamber of 1 MeV should be achievable by a moderately sized system of this design. This is abundantly ample for fusion.

5. The curvilinear geometry of the ring cyclotrons of this invention enhances considerably the probability of head-on collision of the ions at the center of each ring (a significant improvement over random motion plasmas). This is highly advantageous, as previously mentioned, because all the k. e. of colliding ions can go into reactions. None of the energy need be wasted shifting the center of mass of (bulk) material. The head-on effect is nonlinear in favor of higher energy systems.

SUMMARY DESCRIPTION OF THE DRAWINGS

DISCUSSION OF THE DRAWINGS

Figure 1:
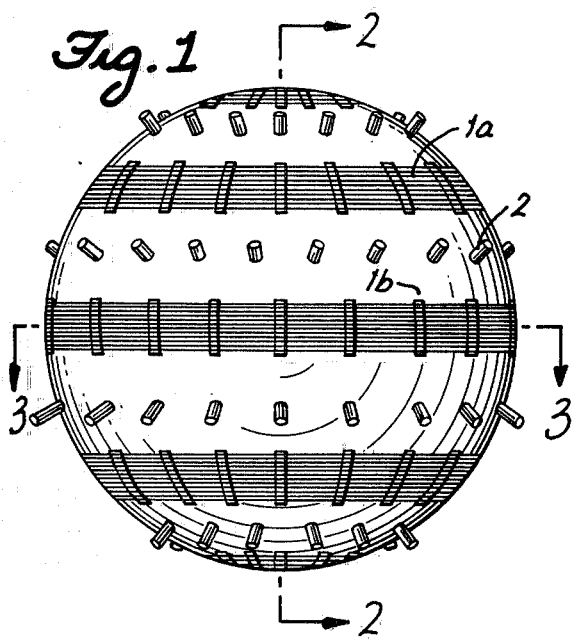
FIG. 1 shows an overall spherical embodiment of the invention.
Figure 2:
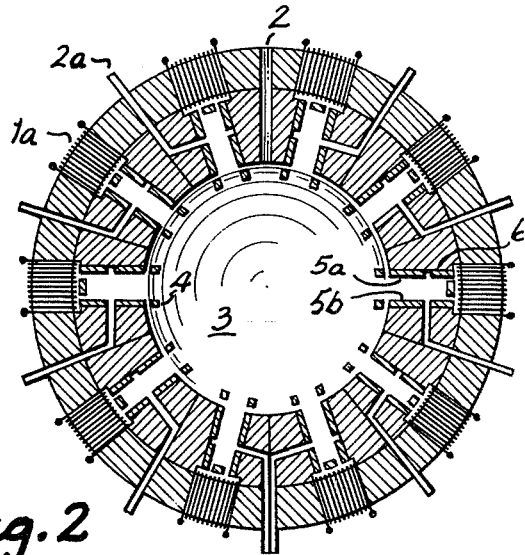
FIG. 2 shows Section AA' of FIG. 1, showing the C-magnets broadside.
Figure 4:
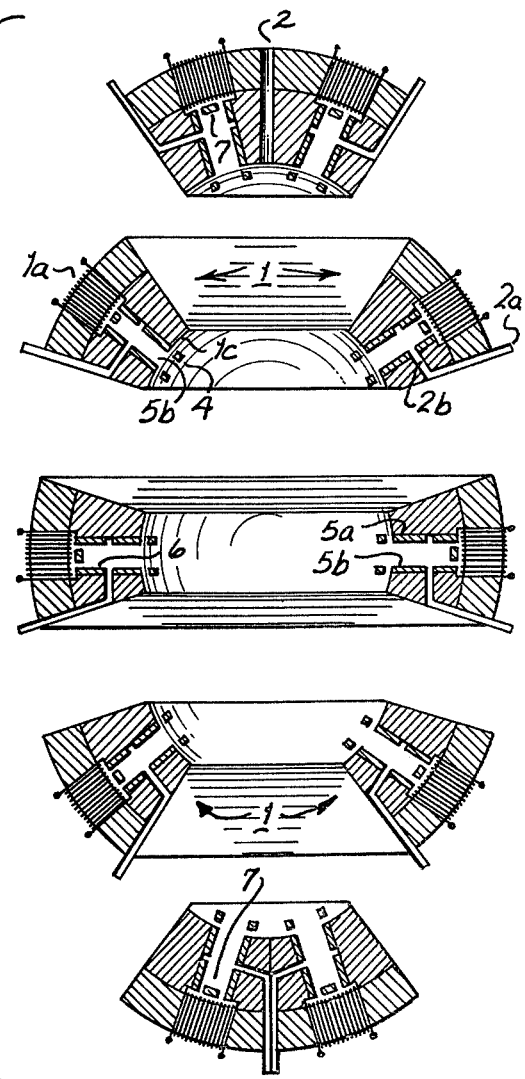
FIG. 4 is an exploded view of FIG. 2, showing a spherical wedge embodiment of the ring cyclotrons.

FIG. 1, upper left, shows an overall view of the invention. The point of view of Sections AA and BB' are indicated by broken lines, arrows and characters on said overall view. Section AA' is indicated by FIG. 2 and an expanded view of AA is shown in FIG. 4. Each component has a number which is the same throughout the drawing plans.

All FIGS. show C-magnets 1 arranged in overall spherical formation. That is, C-magnets 1 are shown as rings or spherical wedges, energized by Windings 1a going through Winding Slots 1b. The system is serviced by Input-Output Tubes 2 containing Fusionable Gas Supply tubes 2a Ion Injection Tubes 2b and other customary tubes not shown such as vacuum pump tubes, electrical line conduits, heat exchangers, and supercooling fluid tubes. Said C-Magnets 1 and Input-Output Tubes 2 are centered around Reaction Chamber 3 which is an evacuated region defined by the inner lips of said C-Magnets 1 and by Focus Coils 4 which direct circular sheets of ions toward the middle of said Reaction Chamber 3.

Figure 3:
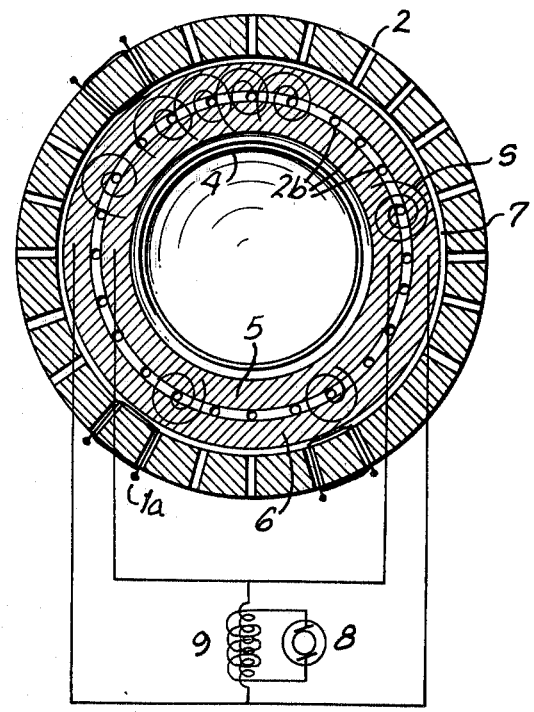
FIG. 3 is Section BB' of FIG. 1, showing spiral pathways of the fusionable ions.

Section BB' as shown in FIG. 3 shows a top view of Flat Ring Electrodes 5 and 6 between which ions are injected from Ion Injection Tubes 2b. (Said ions are atoms of a potentially fusionable gas such as deuterium, energized by any of several standard techniques not shown such as electrical arcs or lasers.) Flat Ring Electrodes 5 and 6 are located in the gaps of C-magnets 1, as shown in Section AA' and its expanded view. Outer Rim 7 is a metal band running around each ring perpendicular to said Flat Ring Electrodes 5 and 6 in the gap of C-Magnets 1. Said Outer Rim 7 can be either connected electrically to Flat Ring Electrode 6 or insulated from same. If electrically connected, it is to be supercharged periodically; if insulated therefrom it is to be steadily charged—in either case it is to deflect ions out of orbit away from the outer wall toward the middle of the reaction chamber. Outer Rim 7 is also an optical reflector shaped to reflect back visible radiation toward the center of the system. It is coated with a film of lithium and connected to heat exchangers through Input-Output Tubes 2. Flat Ring Electrodes 5 and 6 are connected to a kilovoltage megahertz power supply such as AC Generator 8 and Induction Coil 9 in Section BB'.

Section BB' FIG. 3, shows typical cyclotron spiral pathways S (designated as a letter, not a number, since the pathways are not a physical component). Ions introduced between Ring Electrodes 5 and 6 gain energy each time they cross the gap; meanwhile they are deflected circularly by the magnetic induction field of C-Magnets 1, the resultant forces causing the spiral motion indicated. Actually the ion motion is helical so the current in C-Magnets Windings 1a must be sufficient for the associated inductive magnetic field to be on the order of 1 Weber/mtr$^2$ in order to repress the pitch of the helices.

A starburst is shown at the center of Reaction Chamber 3 in FIG. 2 and FIG. 3 Section BB', indicating the primary place of nuclear fusion reactions. Reactant products generally fall on the inner Surfaces 1c of C-Magnets 1 and on the inner surface of Outer Rim 7, and the energy is taken out by heat and electrical exchanges in Input-Output Tubes 2.

Uncollided or scattered ions are generally to go through the reaction chamber toward the other side and enter a new magnetic field and approach a charged outer rim both of the same strength as that or those left behind. Thus the uncollided or scattered ions cannot in principle strike the outer walls (and give up the energy invested in them). Accordingly the plasma is OPERATIONALLY CONTAINED. Ions arriving out of phase with the ring electrodes generally drop back in orbit, thence are reaccelerated promptly back to fusion velocities, deflected again into the reaction chamber, ad infinitum. Head-on colliding, reacting, fusing ions generally emit high velocity products which indeed are planned to hit the energy absorbing walls from where their energy is taken away and converted to electricity.

I claim:

1. A ring cyclotron nuclear fusion system comprising a plurality of annular rings of varying diameter joined to form a spherical reaction chamber; each of said rings containing; (a) a plurality of spherical wedge electromagnets of C-shape cross section, said electromagnets having lips and being continuously connected around said ring; (b) flat annular ring electrodes located between the poles of said C-shaped electromagnets, said electrodes being of different diameters and positioned so as to form a gap there between; (c) a plurality of pin hole sized injection ports along the gap, each of said ports connected to an ion injector beam of at least about $10^{13}$ ions/cc; (d) focus coils located at the innermost lips of said C-shaped electomagnets (e) charged outer rim means; (f) output tubes and a high frequency kilovolt power supply connected to said electrodes wherein low energy ions are injected into the gap, accelerated by said electrodes so as to follow spiral or helical pathways until achieving sufficient energy for fusion where upon said ions are deflected out of orbit by said charged outer rim means and said focus coils so as to form beams, directed to the center of the spherical reaction chamber, and some of said beams colliding head-on with other of said beams and noncolliding ions passing on across the reaction chamber into other C-shaped electromagnets and thence spiral back toward the middle ad infinitum or until the ions collide with one another or the apparatus.

* * * * *